J. H. ROBERTS.
Scroll-Sawing Machine.

No. 165,757.

Patented July 20, 1875.

Witnesses.
S. W. Piper
L. W. Foller

John H. Roberts.
by his attorney.
R. H. Eddy

UNITED STATES PATENT OFFICE.

JOHN H. ROBERTS, OF BOSTON, MASSACHUSETTS.

IMPROVEMENT IN SCROLL-SAWING MACHINES.

Specification forming part of Letters Patent No. 165,757, dated July 20, 1875; application filed April 29, 1875.

*To all whom it may concern:*

Be it known that I, JOHN H. ROBERTS, of Boston, of the county of Suffolk and State of Massachusetts, have invented a new and useful Improvement in Scroll-Sawing Machines; and do hereby declare the same to be fully described in the following specification and represented in the accompanying drawings, of which—

Figure 1:
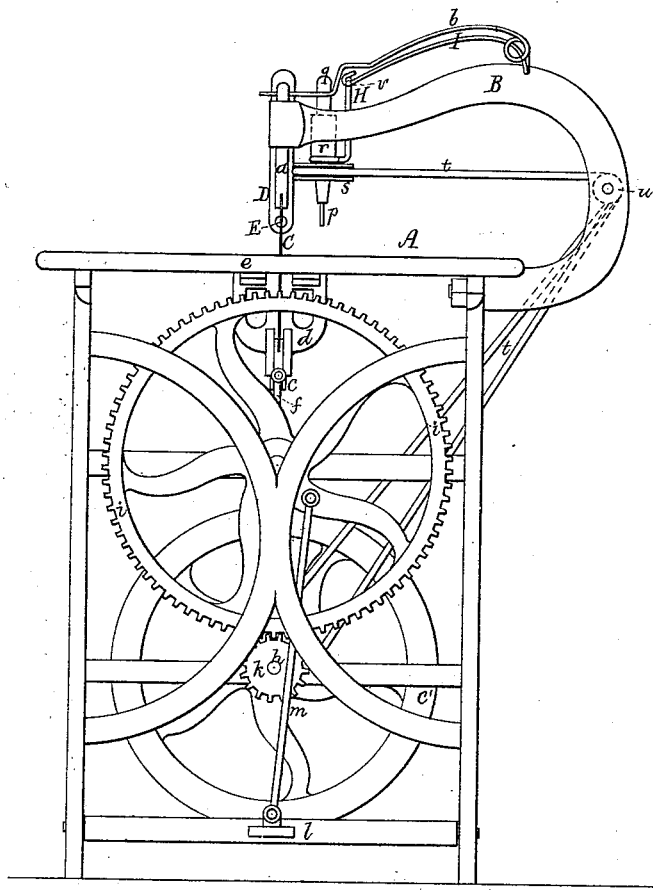
Figure 2:
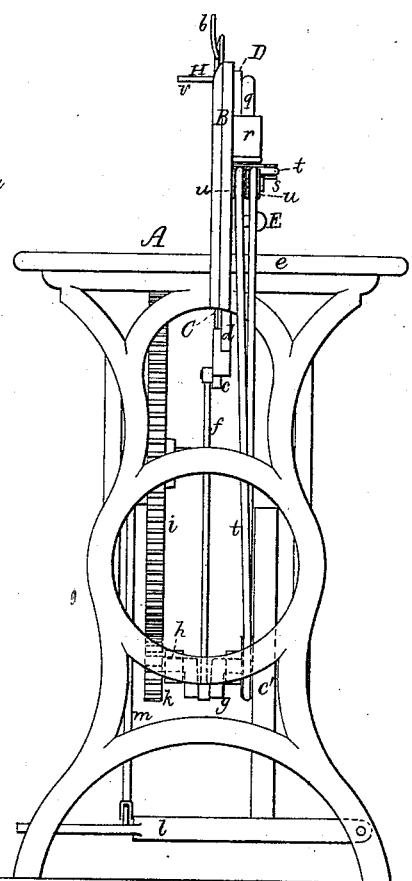
Figure 3:
Figure 4:
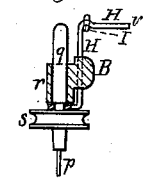

Figure 1 is a side elevation, and Fig. 2 an end view, of a jig-sawing machine provided with my invention. Fig. 3 is a horizontal section of the adjustable saw-guide and supporter and its carrier. Fig. 4 is a transverse section of the boring mechanism.

My invention relates not only to means of guiding and supporting the saw close to an article to be sawed, but to mechanism for depressing and raising the borer and its spindle.

In the drawings, A denotes the table of the saw. A curved arm, B, projecting over the top of the table, in manner as shown, has a slide, $a$, arranged in it to play up and down vertically, such slide being provided with a lifting-spring, $b$, applied to it and the arm B, and formed as shown. The jig-saw C at its upper end or part is fixed to the lower end or portion of the said slide, the saw at its lower extremity being fixed to another slide, $c$, arranged in and guided in its vertical movements by a bracket, $d$, fixed to the under side of the table top $e$. This slide $c$ has applied to it suitable mechanism for drawing it and the saw downward. Such mechanism, as shown in the drawings, consists of a connecting-rod, $f$, a bell-crank, $g$, a shaft, $h$, gears $i$ $k$, a pedal, $l$, and a connecting-rod, $m$, the shaft being provided with a fly-wheel, $c'$, and all being arranged as shown.

There extends down from the arm B, and directly in rear of and parallel to the rear edge of the saw, an auxiliary arm, D, having a female screw made through it laterally, to receive a male screw, E, provided with a nicked head. The inner end of the said screw E is nicked or notched diametrically to receive or embrace the saw at its rear edge. As the saw may wear into the screw, the latter may be revolved and set up to it, so as to properly support and guide it and keep it from springing in an article while in the act of being sawed by it. The nicked or notched pointed screw and its carrier thus afford an easy means of supporting the saw and of adjusting the bearing-surfaces as they may become worn, as each half-turn of the screw will set it forward up to the saw, which, previously to the screw being revolved, is to be sprung out of notch thereof.

The boring-tool is shown at $p$ as projecting from the lower end of a spindle, $q$, arranged as shown, to move vertically in a projection, $r$, from the arm B, the spindle being provided with a whirl, $s$, to receive an endless band, $t$, that goes around it, two guide-pulleys, $u$ $u$, and also around a driving-pulley fixed on the fly-wheel shaft.

For depressing the boring-tool spindle, I make use of a vertical slide, H, to play through the arm B, and to be provided with a lifting-spring, I, arranged and applied to it and the said arm B, as shown. The slide H at its foot extends to and around the spindle and in a groove formed therein. At its upper part the slider has a handle, $v$, projecting horizontally from it.

By means of the slider the boring-spindle may be readily depressed by an attendant, it being raised by its spring.

The devices above described for depressing and raising the boring-tool spindle enable this to be accomplished with great ease and convenience by the attendant, and save him all necessity of reaching over the lifting-spring of the saw, and thereby being in danger of being injured by it.

I do not claim any mechanical device or combination as described or claimed in the United States Patent No. 162,588.

What I claim as my invention is as follows:

1. The nicked point screw E and its carrier D, combined and arranged, with the arm B and jig-saw $c$, substantially as specified.

2. The boring-tool spindle depresser H, applied to the spindle and the arm B, as set forth, in combination with the spring I fixed to said depresser and arm, and arranged therewith as represented.

JOHN H. ROBERTS.

Witnesses:
R. H. EDDY,
J. R. SNOW.